US011924223B2

(12) United States Patent
Bhandari et al.

(10) Patent No.: US 11,924,223 B2
(45) Date of Patent: *Mar. 5, 2024

(54) TECHNOLOGIES FOR PROVING PACKET TRANSIT THROUGH UNCOMPROMISED NODES

(71) Applicant: Cisco Technology, Inc., San Jose, CA (US)

(72) Inventors: Shwetha Subray Bhandari, Bangalore (IN); Eric Voit, Bethesda, MD (US); Frank Brockners, Cologne (DE); Carlos M. Pignataro, Cary, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/728,333

(22) Filed: Apr. 25, 2022

(65) Prior Publication Data

US 2022/0247757 A1 Aug. 4, 2022

Related U.S. Application Data

(63) Continuation of application No. 16/555,869, filed on Aug. 29, 2019, now Pat. No. 11,343,261.

(60) Provisional application No. 62/830,156, filed on Apr. 5, 2019.

(51) Int. Cl.
*H04L 9/40* (2022.01)
*H04L 69/22* (2022.01)

(52) U.S. Cl.
CPC ........ *H04L 63/123* (2013.01); *H04L 63/1425* (2013.01); *H04L 69/22* (2013.01)

(58) Field of Classification Search
CPC .... H04L 63/123; H04L 63/1425; H04L 69/22
USPC ......................................... 726/23
See application file for complete search history.

(56) References Cited

U.S. PATENT DOCUMENTS

| | | | |
|---|---|---|---|
| 9,621,520 | B2 | 4/2017 | Quinn et al. |
| 10,805,341 | B2 | 10/2020 | Anderson et al. |
| 10,938,685 | B2 | 3/2021 | Indiresan et al. |
| 2015/0229618 | A1 | 8/2015 | Wan et al. |
| 2015/0244717 | A1* | 8/2015 | Jin .................. G06F 21/53 726/4 |
| 2016/0315921 | A1 | 10/2016 | Dara et al. |
| 2017/0111209 | A1 | 4/2017 | Ward et al. |
| 2019/0199533 | A1 | 6/2019 | Boutnaru |
| 2019/0349426 | A1 | 11/2019 | Smith et al. |

(Continued)

*Primary Examiner* — James E Springer
(74) *Attorney, Agent, or Firm* — Polsinelli P.C.

(57) ABSTRACT

Technologies for proving packet transit through uncompromised nodes are provided. An example method can include receiving a packet including one or more metadata elements generated based on security measurements from a plurality of nodes along a path of the packet; determining a validity of the one or more metadata elements based on a comparison of one or more values in the one or more metadata elements with one or more expected values calculated for the one or more metadata elements, one or more signatures in the one or more metadata elements, and/or timing information associated with the one or more metadata elements; and based on the one or more metadata elements, determining whether the packet traversed any compromised nodes along the path of the packet.

20 Claims, 9 Drawing Sheets

(56) References Cited

U.S. PATENT DOCUMENTS

2020/0162307 A1* 5/2020 Chen ................ H04L 65/00
2020/0322382 A1* 10/2020 Wang ................ H04L 63/0281
2021/0367880 A1* 11/2021 Zhang ................ H04L 41/0677

* cited by examiner

TECHNOLOGIES FOR PROVING PACKET TRANSIT THROUGH UNCOMPROMISED NODES

CROSS-REFERENCE TO RELATED APPLICATIONS

This application is a Continuation of U.S. patent application Ser. No. 16/555,869, filed Aug. 29, 2019, which claims the benefit of, and priority to, U.S. Provisional Patent Application No. 62/830,156, filed Apr. 5, 2019, entitled "TECHNOLOGIES FOR PROVING PACKET TRANSIT THROUGH UNCOMPROMISED NODES", the contents of which are incorporated herein by reference in their entireties.

TECHNICAL FIELD

The present disclosure generally relates to the field of computer networking, and more particularly to assessing reliability and trustworthiness of devices operating within a network.

BACKGROUND

Trustworthiness of a node on a network may degrade over time after its initial deployment. If a node becomes compromised, traffic processed by that node—and even the network itself—can similarly become compromised. Thus, verifying the trustworthiness of nodes processing packets on a network can help reduce the likelihood of such traffic—and the network—becoming compromised. In some cases, certain verification checks can be implemented to attempt to verify the integrity of a node in order to reduce or mitigate the harm caused by the node becoming compromised. For example, an integrity verification application can check a node's memory to validate the integrity of the node. When errors are found during the check, the integrity verification application can implement steps to return the node to a trusted state.

However, such verification checks are expensive and unreliable, often inaccurately assuming that a node is likely to be in a normal or trusted state soon after being validated and less likely to be in a normal state just before such validation. Moreover, current security approaches are unable to accurately or efficiently confirm the trustworthiness of the nodes along a path of the packet, which can leave the data associated with the packet vulnerable to hacking, leaks and unauthorized use and access.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1:
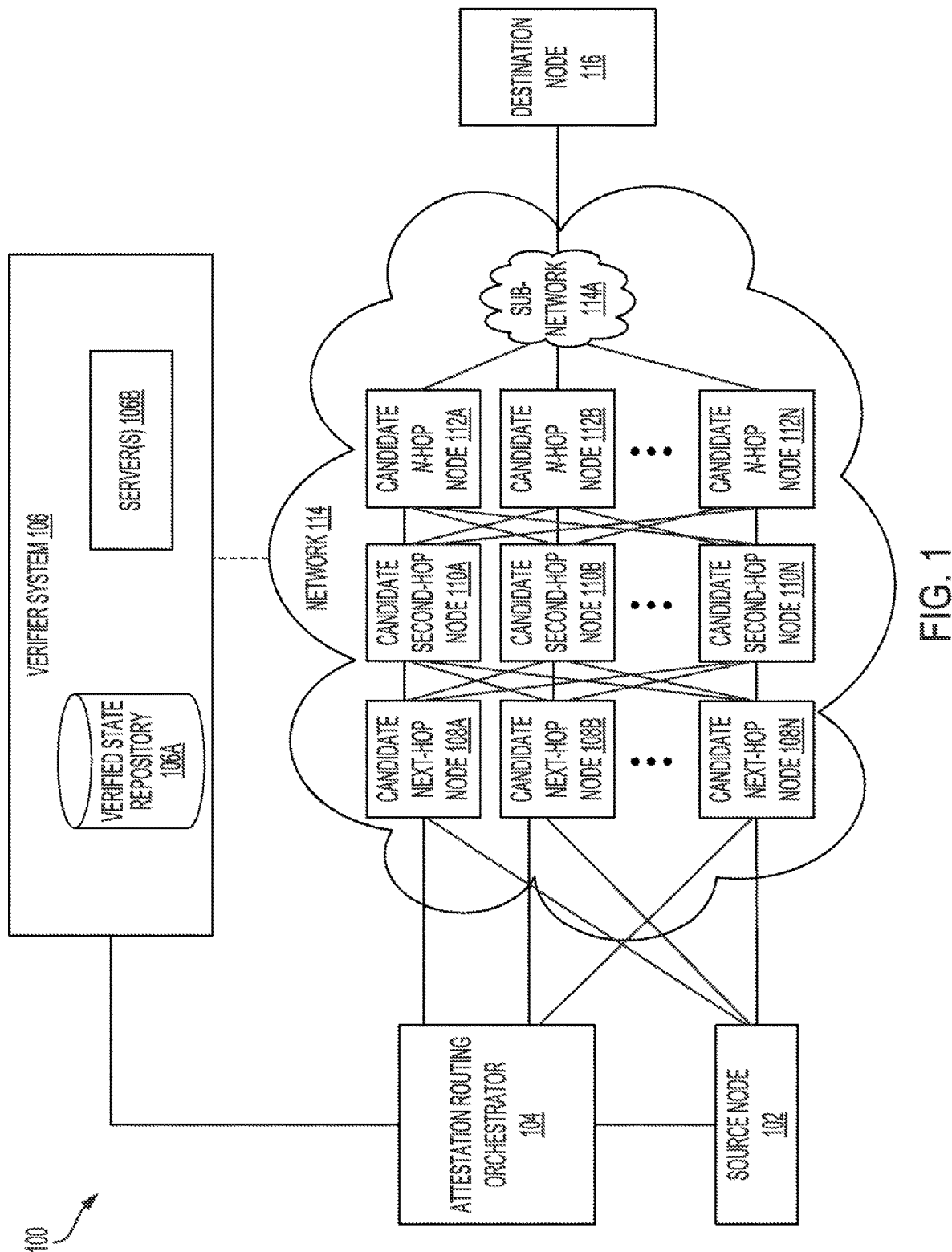
FIGS. 1 through 3 illustrate example networking environments in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, methods, and computer-readable media for proving packet transit through uncompromised nodes. In some aspects, a method for proving packet transit through uncompromised nodes is provided. An example method can include receiving a packet including one or more metadata elements generated based on security measurements from a plurality of nodes along a path of the packet; determining a validity of the one or more metadata elements based on a comparison of one or more values in the one or more metadata elements with one or more expected values calculated for the one or more metadata elements, one or more signatures in the one or more metadata elements, and/or timing information associated with the one or more metadata elements; and based on the one or more metadata elements, determining whether the packet traversed any compromised nodes along the path of the packet.

In some aspects, a system for proving packet transit through uncompromised nodes is provided. An example system can include one or more processors and memory having stored therein instructions which, when executed by the one or more processors, cause the one or more processors to receive a packet including one or more metadata elements generated based on security measurements from a plurality of nodes along a path of the packet; determine a validity of the one or more metadata elements based on a comparison of one or more values in the one or more metadata elements with one or more expected values calculated for the one or more metadata elements, one or more signatures in the one or more metadata elements, and/or timing information associated with the one or more metadata elements; and based on the one or more metadata elements, determine whether the packet traversed any compromised nodes along the path of the packet.

In some aspects, a non-transitory computer-readable medium for proving packet transit through uncompromised nodes is provided. An example non-transitory computer-readable medium can include instructions which, when executed by one or more processors, cause the one or more processors to receive a packet including one or more metadata elements generated based on security measurements from a plurality of nodes along a path of the packet; determine a validity of the one or more metadata elements based on a comparison of one or more values in the one or more metadata elements with one or more expected values calculated for the one or more metadata elements, one or more signatures in the one or more metadata elements, and/or timing information associated with the one or more metadata elements; and based on the one or more metadata elements, determine whether the packet traversed any compromised nodes along the path of the packet.

In some examples, the one or more metadata elements referenced in the example method, system, and non-transitory computer-readable medium described above can include the security measurements or one or more hash values representing the security measurements. Moreover, in some cases, the one or more metadata elements can include node integrity metadata generated based on respective node integrity information from each of the plurality of nodes along the path of the packet, and the respective node integrity information can be generated based on a respective security measurement from each of the plurality of nodes along the path of the packet.

In some aspects, the packet can be received by a node at a hop in the path of the packet, and the example method, system, and non-transitory computer-readable medium described above can include updating a verification digest in the one or more metadata elements in the packet to yield an updated verification digest, the verification digest being updated based on a hash of at least one security measurement associated with the node. Moreover, in some examples, determining whether the packet traversed any compromised nodes along the path of the packet can be based at least partly on the updated verification digest, and the verification digest can be based on a respective hash generated by a second node at previous hop in the path, the respective hash being based on one or more security measurements at the second node.

In some cases, the verification digest is further based on a second verification digest generated by a third node at a different previous hop in the path, the second verification digest being based on a second respective hash of one or more additional security measurements at the third node.

In some examples, the one or more metadata elements are included in an In-Situ (or in-band) Operations, Administration, and Maintenance (IOAM) data field on the packet, an Inband Network Telemetry (INT) packet header associated with the packet, an Inband Flow Analyzer (IFA) header associated with the packet, or a header associated with an In-situ Flow Information Telemetry service used to transmit the packet, the IOAM data field being associated with an IOAM trace option or an IOAM proof-of-transit (POT) option. In some aspects, the one or more metadata elements can include one or more nonce values associated with one or more nodes from the plurality of nodes.

In some examples, the timing information associated with the one or more metadata elements can include a respective timestamp associated with each of the plurality of nodes, one or more Time-Based Uni-Directional Attestation (TUDA) time-synchronization tokens, one or more Trusted Platform Module (e.g., TPM, TPM2, or any current or future version of TPM) counters, and/or one or more packet trace timestamps defined by an IOAM telemetry scheme.

In some examples, a data element in the one or more metadata elements and/or the one or more signatures in the one or more metadata elements can be generated by one or more TPMs implemented by one or more nodes from the plurality of nodes and/or one or more cryptoprocessors implemented by the one or more nodes. Moreover, the security measurements can include information identifying a respective firmware at each of the plurality of nodes, what software has been loaded at each of the plurality of nodes, a respective sequence of software loaded at each of the plurality of nodes, hardware information associated with the plurality of nodes, and/or any operating system changes at the plurality of nodes.

In some aspects, determining whether the packet traversed any compromised nodes along the path of the packet can include identifying each hop traversed by the packet and/or providing a proof-of-transit of the packet.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

Example Embodiments

The technologies herein can provide proof of packet transit through uncompromised network nodes, to ensure that packets have not traversed untrusted or compromised nodes that can harm or improperly access the packets and associated data. In some examples, the technologies herein can implement proof-of-transit (POT) and attestation techniques to confirm the integrity of a node, verify that traffic traverses a defined set of nodes, and verify that such nodes have not been compromised. In some cases, such POT and attestation techniques can implement canary stamps (e.g., tokens or metadata elements containing or reflecting security measures taken at one or more nodes).

Figure 8:
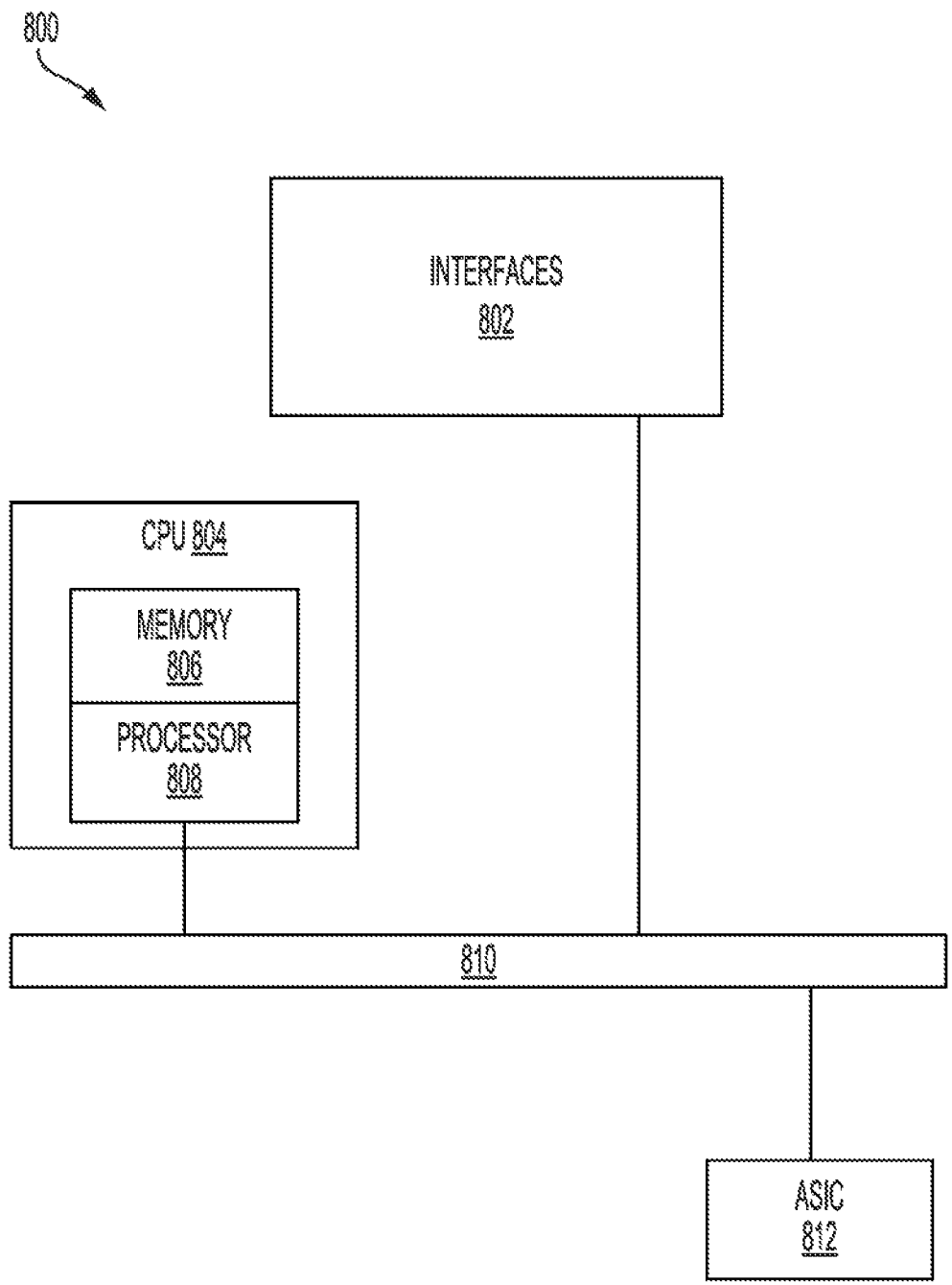
FIG. 8 illustrates an example network device in accordance with some examples.
Figure 9:
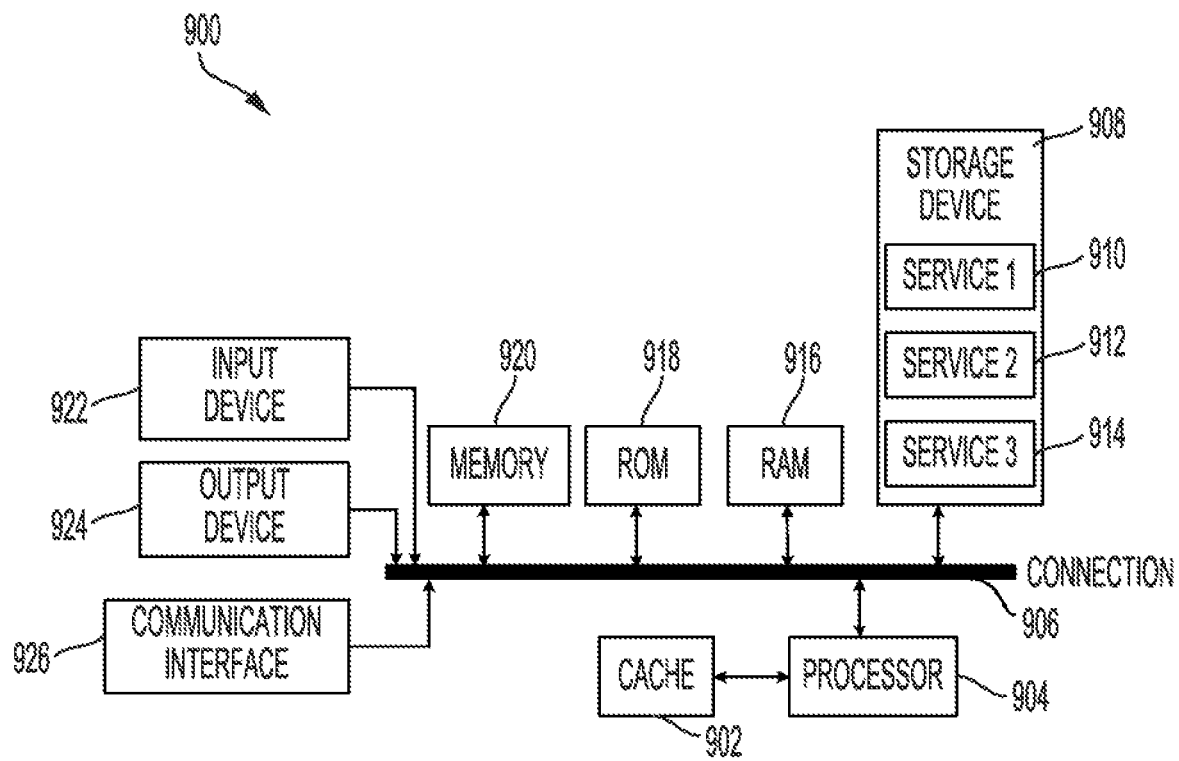
FIG. 9 illustrates an example computing device architecture in accordance with some examples.

Disclosed herein are systems, methods and computer-readable storage media for proving packet transit through uncompromised nodes. The present technologies will be described in more detail in the following disclosure as follows. The disclosure begins with an initial discussion of systems and technologies for providing explicit verifiable proof of integrity of network nodes traversed by packets. A description of example systems, methods and environments for providing verifiable proof of integrity of network nodes traversed by packets, as illustrated in FIGS. 1 through 7, will then follow. The discussion concludes with a description of an example network device and an example computing device architecture, as illustrated in FIGS. 8 and 9, including example hardware components suitable for performing various networking and computing operations described herein.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncomprised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices, and maintain these logs in trusted storage. These logs can be protected by embedding a private key into every trust anchor produced for a hardware device, and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, canary stamps, which can refer to tokens or metadata elements containing security measurements or evidence, can be used to provide verifiable evidence of device trustworthiness (e.g., integrity, state, etc.). Such verifiable evidence can be appended or included in packets transmitted by nodes on a network. The canary stamps can thus be used to evaluate the trustworthiness of a node(s) and react accordingly. For example, a device or entity can review a canary stamp associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is a random number that can be used to introduce randomness. In some cases, a nonce can passed into a TPM and/or incorporated into a canary stamp. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages. In some cases, such tokes can include canary stamps. Such tokens can be referred to as canary stamps because each signed measurement is like a stamp proving its authenticity, and like a canary in a coal mine they indicate an early sign of trouble.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, canary stamps (e.g., tokens or metadata elements) can be created by extracting current counters (e.g., clock, reset, restart) from a node's TPM, and incorporating such counters and security measures taken from the node into a packet. In some examples, the current counters and/or security measures can be hashed with information within an external TPM. The canary stamp can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of canary stamps can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, one or more canary stamps (e.g., tokens or metadata elements) and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, canary stamps (e.g., tokens or metadata elements containing or reflecting security measures) are used as previously mentioned to validate the integrity of a node and perform continuous evaluation of node integrity. Thus, the canary stamps described herein can be used to provide proof of transit through uncompromised nodes.

In some examples, the canary stamp can be added as additional metadata to packets that traverse a network where proof of transit via uncompromised nodes is desired. Various strategies can be implemented for transporting a canary stamp in a packet. In some cases, a canary stamp can be carried within an In-Situ (or in-band) Operations, Administration and Management (IOAM) data field.

In some implementations, a canary stamp can be carried IOAM trace data. For example, the canary stamp (e.g., the token or metadata) can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A canary stamp or canary stamp digest can be added in the IOAM trace option of a packet by each node that forwards the packet.

When the packet reaches a node (e.g., the destination node and/or an intermediate node) that removes IOAM metadata (e.g., an IOAM decapsulating node), the validity of a canary stamp in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the canary stamp. This is because canary stamp measurement values can often change infrequently. The verifier may only need to validate a canary stamp or canary stamp digest carried within an IOAM data trace whenever the security measurements associated with the canary stamp or canary stamp change (e.g., a verifier may only need to check with a controller whenever it sees a node's TPM extends a Platform Configuration Register (PCR) value which was not previously confirmed by the verifier).

In some cases, when only the time ticks within a signed canary stamp increases, only the signature of the canary stamp is validated. To do this, the verifier may use the public key of any node which can place a canary stamp. Such signature validation can be done without using a controller to verify stamp measurements.

In another example, a packet can carry IOAM POT data with space optimization of canary stamp values. This example can leverage a new IOAM POT data field, which can carry canary stamp or a hash extend of a canary stamp and which can also carry canary stamp data across nodes. In some cases, a canary stamp hash extend can be a similar method as a Platform Configuration Registers (PCRs) extend operation performed by TPMs.

In some cases, the canary stamp hash extend can provide a one-way hash so that canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value||hash (canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value||hash(canary stamp of the node||PPN)). A node creating the new value for the IOAM canary stamp digest can thus take the value of any previous IOAM canary stamp digest, and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. In some cases, a verifier can be an inline device or a centralized device. Moreover, in some examples, nodes that are expected to be traversed can be identified using IOAM tracing, routing state or by sending active probes. A match between the value of POT data carrying a canary stamp digest and the expected canary stamp value can prove that the packet traversed through trusted or uncompromised nodes.

In some examples, one or more strategies can be implemented to optimize canary stamp validation. For example, canary stamps can detect attempts of a replay attack by embedding a nonce as well as TPM or TPM2 counters (e.g., clock, reset, restart). In some cases, this nonce can be part of the canary stamp and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize canary stamp validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a stamp value. A verifier can know the freshness of a stamp it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its canary stamp. To get attested time, a TUDA (Time-Based Uni-Directional Attestation) scheme such as the TUDA scheme described in https://datatracker.ietf.org/doc/draft-birkholz-i2nsf-tuda/, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the canary stamp as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value hash(canary stamp of the node||TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Having provided an initial discussion of example concepts and technologies for providing explicit verifiable proof of integrity of network nodes traversed by packets, the disclosure now turns to FIG. 1.

FIG. 1 is a block diagram of an example of networking environment 100 in accordance with some implementations. While pertinent features are shown, those of ordinary skill in the art will appreciate from the present disclosure that various other features have not been illustrated for the sake of brevity and so as not to obscure aspects of the example implementations disclosed herein.

In this example, the networking environment 100 can include a network 114 of interconnected nodes (e.g., 108A-N, 110A-N, and 112A-N). The network 114 can include a private network, such as a local area network (LAN), and/or a public network, such as a cloud network, a core network, and the like. In some implementations, the network 114 can also include one or more sub-networks, such as sub-network 114A. Sub-network 114A can include, for example and without limitation, a LAN, a virtual local area network (VLAN), a datacenter, a cloud network, a wide area network (WAN), etc. In some examples, the sub-network 114A can include a WAN, such as the Internet. In other examples, the sub-network 114A can include a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N, and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
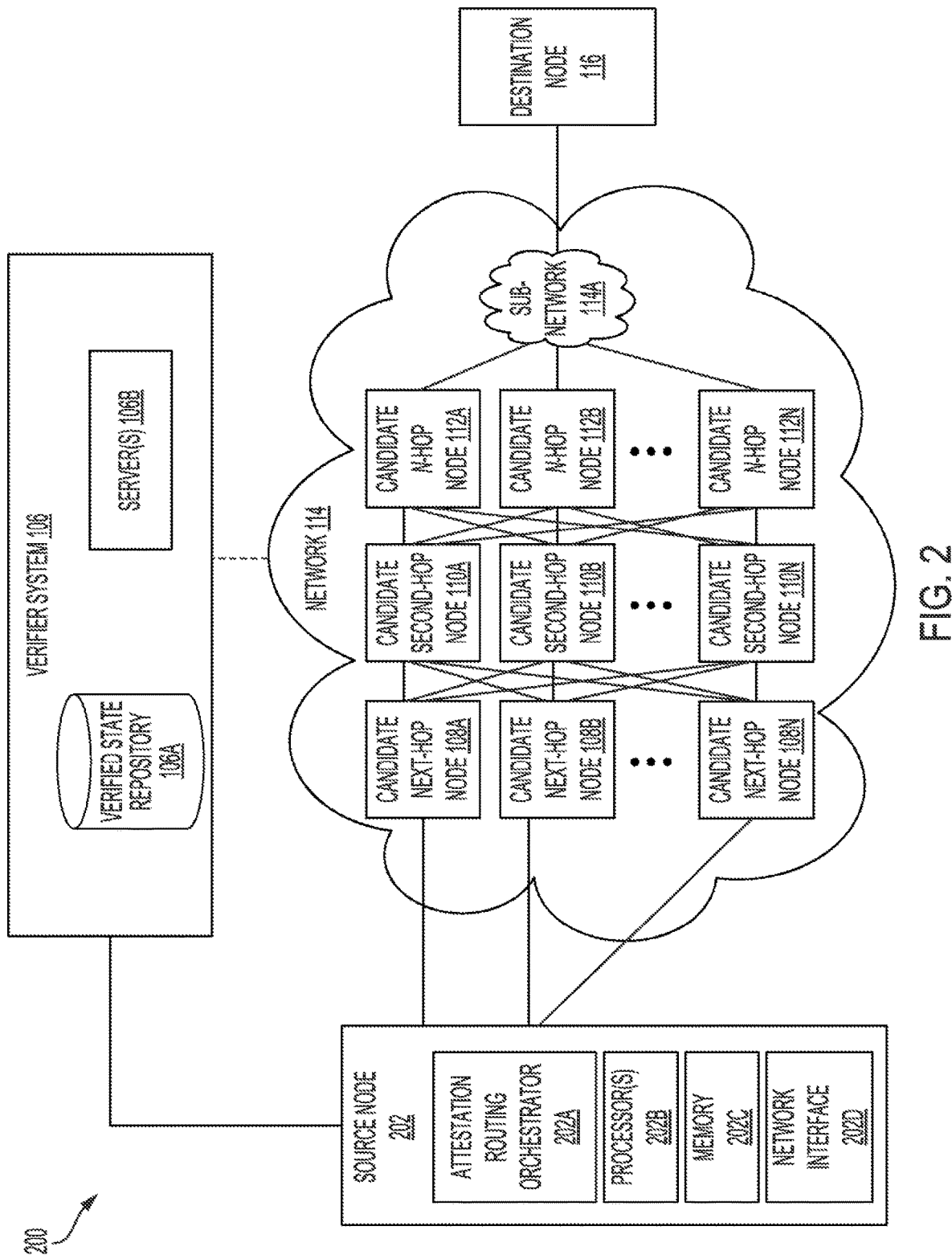

FIG. 2 is a block diagram of another example networking environment 200 in accordance with some implementations. In this example, the networking environment 200 includes a source node 202 that implements an attestation routing orchestrator 202B. In some implementations, the attestation routing orchestrator 202B can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
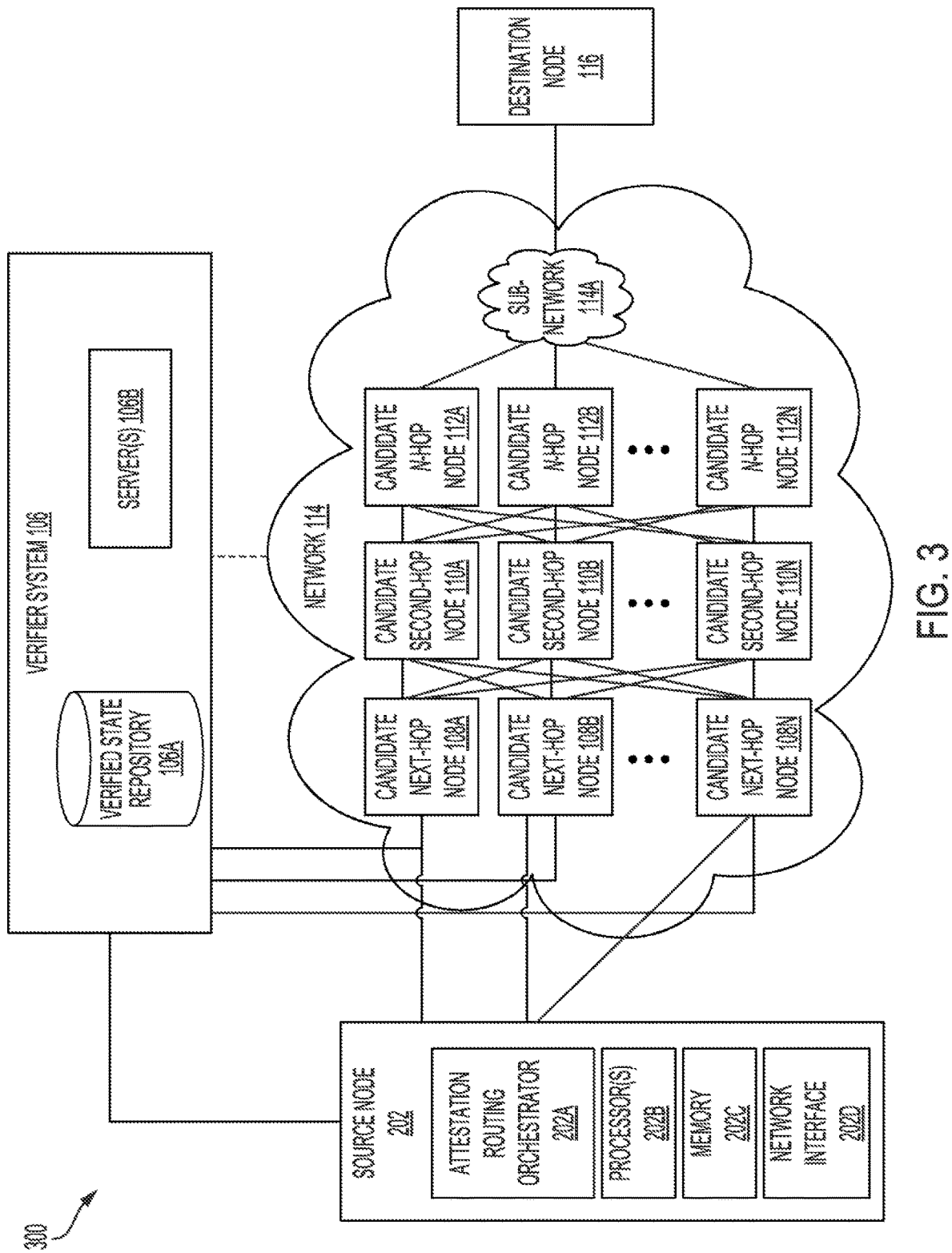

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
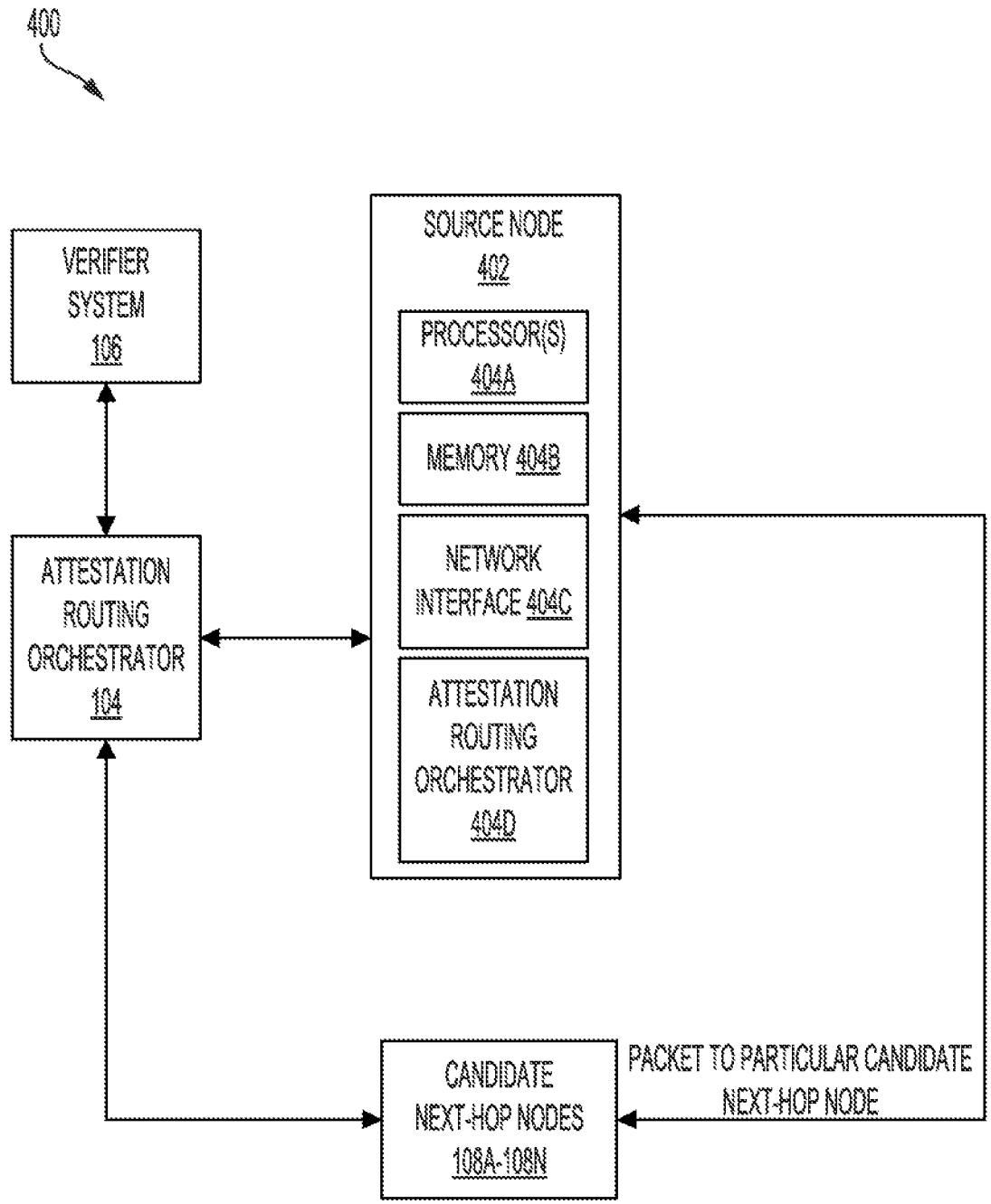
FIG. 4 illustrates an example of a controller orchestrated attestation-based routing, in accordance with some examples.

FIG. 4 is a block diagram of an example controller-orchestrated attestation-based routing 400, in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manger 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

In some cases, whether a network device has been compromised can be determined based on indicators associated with the network device and time information. The indicators can include, but are not limited to, a set of security measurements or evidence footprints which indicate whether a particular device is compromised. Such indicators can come from one or more sources such as, for example and without limitation, TPM, canary stamps, Syslog, YANG Push, EEM, peer devices, traffic counters, and other sources. Visibility can be a method of identifying a compromise in a timely manner.

When there are no indicators (i.e., no security measurements or footprints available), the probability of a device being compromise can be a function of the time which has passed since a last validation that the device is in a known good state. In some cases, with the foregoing indicators, a formula can be provided for estimating probability or chance of a compromise on any given device operating within a network.

For example, $P\_v_1$ can be defined as a probability for compromise of type 1 when there is a specific set of events/signatures existing which correspond to the compromise. $P\_v_2$ can be defined as probability for compromise of type 2 and $P\_v_x$ can be defined as probability for compromise of type x. Assuming each of these compromises ($P\_v_1$ through $P\_v_x$) are independent, the following equation can provide the probability of a compromise based on recognized signatures ($P\_v$):

$$P\_v = 1 - ((1-P\_v_1)(1-P\_v_2)(1-P\_v_x)) \quad \text{Equation (1)}.$$

Other type of equations can be used instead of, or in conjunction with, equation (1) when there are interdependencies between different types of evaluated compromises ($P\_v_1$, $P\_v_2$, $P\_v_x$).

Furthermore, in some cases, a given probability (e.g., $P\_v_1$-$P\_v_x$) can be determined based on evidence of events from a device for which the probability of a compromise is being calculated (e.g., via equation (1)) and/or evidence obtained from one or more devices adjacent to the device for which the probability of a compromise is being calculated (e.g., via equation (1)).

In some cases, a probability that an invisible compromise has occurred at a device in the deployment environment can be expressed by the equation:

$$P_i = 1 - ((1 - \text{chance of invisible compromise in time period } t)\text{^number of } t \text{ intervals since a last verification of a good/uncompromised system state}) \quad \text{Equation (2)}.$$

Effectively knowing $P_i$ can imply that an operator knows the half-life which should be expected before a device should be considered compromised independently of any concrete evidence. It should be noted that a probability of an invisible compromise does not have to be static. Real-time modification based on current knowledge of viruses/attacks may be allowed.

With formulates for visible and invisible factors as described above (equation (1) and equation (2)), an overall probability of a compromise for a given device may be given by:

$$P_c = 1 - ((1-P_v)*(1-P_i)) \quad \text{Equation (3)}.$$

Equation (3) provides an indicator of trustworthiness of a given device. This metric considers both time-based entropy and any available evidence which can be correlated to known compromises.

If $P_c$ can be calculated (or roughly estimated), various functions can be efficiently prioritized. For example, a controller may schedule when to do deeper validation (or perhaps direct refresh) of a device. This scheduling could include determining when to perform active checks to validate device memory locations (locations possibly containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of $P_c$. For example, routing or switching behavior might be adjusted/impacted based on the relative trustworthiness of a remote device. Where a higher $P_c$ values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

Figure 5:
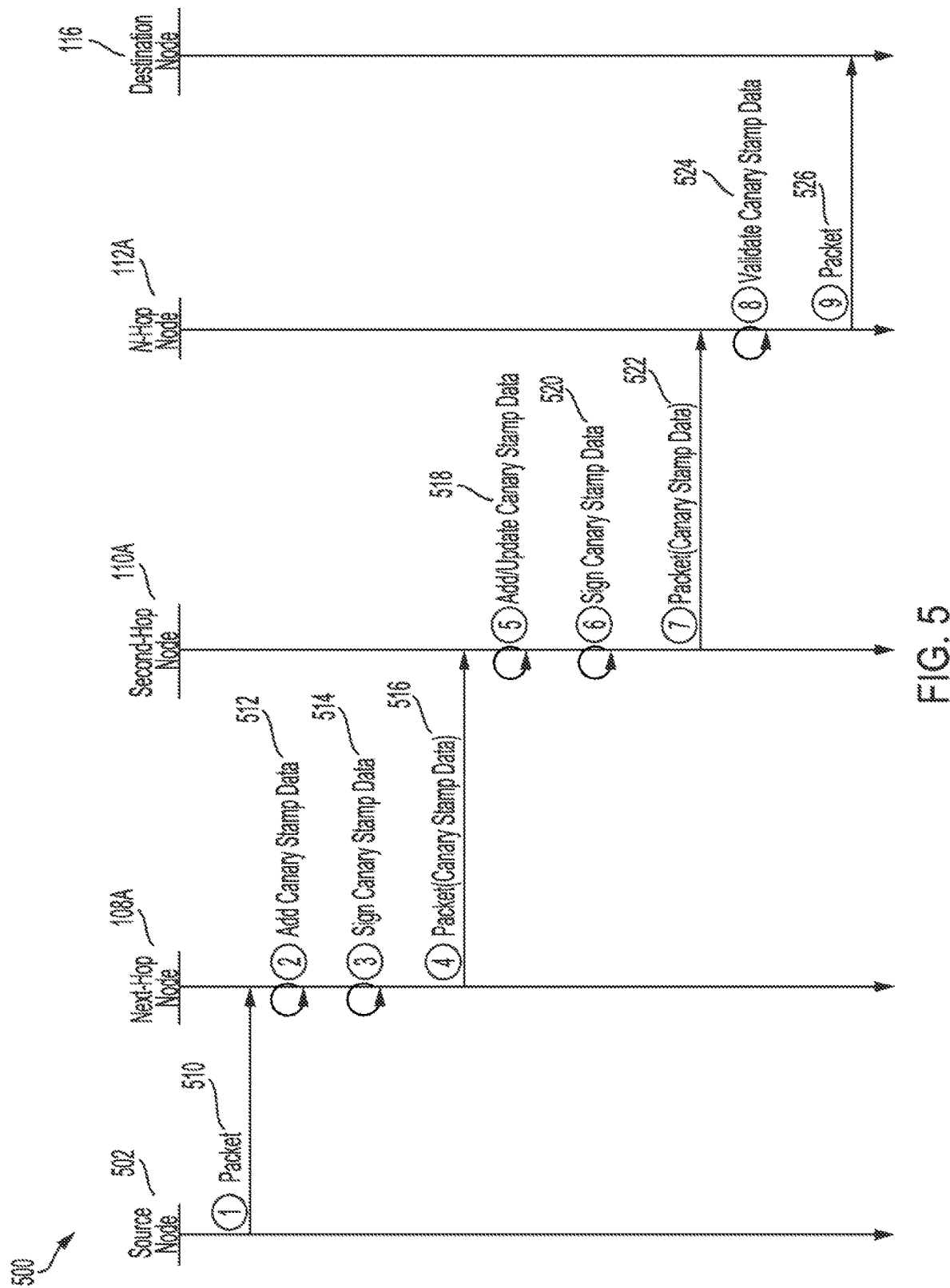
FIGS. 5 and 6 illustrate example flows for providing proof of packet transit through uncompromised nodes, in accordance with some examples.

FIG. 5 illustrates an example flow 500 for providing proof of packet transit through uncompromised nodes. In this example, the source node 502 first sends (510) a packet destined to the destination node 116. The source node 502 can be similar to, or adapted from, source node 102, 202, or 302 shown in FIGS. 1, 2, and 3 respectively.

The packet from the source node 502 is received by a next-hop node 108A along a route to the destination node 116. When the next-hop node 108A receives the packet, it can add (512) canary stamp data to the packet. In some examples, the next-hop node 108A can include the canary stamp data in an IOAM data field on the packet. For example, in some implementations, the next-hop node 108A can add the canary stamp data in an IOAM data field as an IOAM Trace option data element which can be used to carry the canary stamp data in the packet. In other implementations, the next-hop node 108A can add the canary stamp data in a new IOAM POT (proof-of-transit) data field which can be used to carry the canary stamp data in the packet.

In other examples, the next-hop node 108A can include the canary stamp data in an Inband Network Telemetry (INT) header in the packet, an Inband Flow Analyzer (IFA) header in the packet, or a header associated with an In-situ Flow Information Telemetry (IFIT) service used to transmit the packet.

The canary stamp data added to the packet can be used to verify or prove that the next-hop node 108A is a trusted or uncompromised node. For example, a receiving device, such as a verifier system (e.g., 106) or a node along the path of the packet, can analyze the canary stamp data carried in the packet to assess whether the next-hop node 108A is trustworthy and/or compromised. The canary stamp data can include security measurements taken at the next-hop node 108A or a hash/digest of the security measurements. The security measurements can evidence the trustworthiness or integrity state of the next-hop node 108A. For example, the security measurements can include information about a current state of hardware, software, firmware, a runtime environment, etc., at the next-hop node 108A.

Such information can indicate whether the next-hop node 108A has been compromised (e.g., hacked, attacked, accessed/modified without permission, etc.); whether the next-hop node 108A has any unauthorized or untrusted hardware or software components; whether a state (e.g., firmware, hardware, software, boot files, sequence of loaded software, runtime environment, etc.) of the next-hop node 108A has been modified since deployment and/or a previous known state, which could indicate that the next-hop node has been compromised; etc. Non-limiting examples of security measurements can include a hardware state or integrity measurement, a runtime state or integrity measurement, a firmware state or integrity measurement, a software integrity measurement, information identifying what software has been loaded at the node, information identifying a sequence of software loaded at the node, any operating system changes at the node, any application log entries, an identity of the node, and/or any information that can be measured/captured to determine whether the node has been compromised and/or whether the node has had any unverified/suspicious changes.

In some examples, the security measurements can be obtained by a cryptoprocessor on the next-hop node 108A. The cryptoprocessor can provide secure storage and measurement capabilities for the next-hop node 108A. For example, the cryptoprocessor can measure what software was loaded at the next-hop node 108A during and/or since it was booted. As new software is loaded at the next-hop node 108A, the cryptoprocessor can measure the new loaded software. The cryptoprocessor in this example can thus obtain a picture of what software and files have been loaded at the next-hop node 108A and a particular sequence in which the software and files were loaded. The loaded software and files and the load sequence can be used to detect any unexpected or unusual software and files loaded in the next-hop node 108A or an unexpected or unusual load sequence, which can be used to determine whether the next-hop node 108A is trustworthy and/or has been compromised.

In some implementations, the cryptoprocessor can provide the raw security measurements for use as part (or all) of the canary stamp data. In other implementations, the cryptoprocessor can hash the security measurements and provide the hash result for use as part (or all) of the canary stamp data. Moreover, in some cases, the cryptoprocessor can sign the security measurements or a hash of the security measurements to validate the security measurements and/or protect the information against tampering.

In some cases, the canary stamp data can also include a time or counter value which can be used to indicate a freshness of the canary stamp data. For example, the next-hop node 108A can include a time or counter value in the canary stamp data to indicate when the security measurements associated with the canary stamp data were taken and/or an interval between the time when the current security measurements were taken and the time when previous security measurements were taken.

The freshness information can allow a device reviewing or verifying the canary stamp data to determine whether the associated security measurements are sufficiently fresh to be reliable and/or to prevent a malicious actor from simply re-using old data to trick a verifying device. In some cases, the time or counter value can include, for example and without limitation, one or more TPM counters (e.g., clock, reset, restart), a timestamp, or a TUDA time-synchronization token.

In some cases, the canary stamp data can also include one or more nonce values. The one or more nonce values can be used to insert randomness into the canary stamp data to prevent potential replay attacks. In some examples, the one or more nonce values can be provided to the next-hop node 108A by a remote or centralized system, such as the verifier system 106, for example. The remote or centralized system can provide such nonce values to nodes for use in respective canary stamp data in order to insert randomness into such data, as previously described. In such examples, since the nonce values used in canary stamp data are provided and known by the remote or centralized system, the remote or centralized system (and/or a separate verifier system) knows what the values in the canary stamp data and/or the nonce values in the canary stamp data should be or are expected to be, which can allow the remote or centralized system (and/or the separate verifier system) to validate such data and prevent replay attacks.

In some cases, in addition to adding the canary stamp data to the packet, the next-hop node 108A can also cryptographically sign the canary stamp data. In some examples, the next-hop node 108A can sign some or all of the canary stamp data using an encryption algorithm and/or an encryption key, such as a public key provided by a remote or centralized system (e.g., verifier system 106). Moreover, in some examples, the next-hop node 108A can sign some or all of the canary stamp data using a cryptoprocessor on the next-hop node 108A, as previously explained.

Once the next-hop node 108A has added the canary stamp data to the packet, the next-hop node 108A can send (516) the packet with the canary stamp data to the second-hop node 110A. In some implementations, the second-hop node 110A can receive the packet and add/update (518) the canary stamp data in the packet to include canary stamp data associated with the second-hop node 110A. For example, in some cases, the second-hop node 110A can add additional canary stamp data to the packet so the packet includes canary stamp data from both the next-hop node 108A and the second-hop node 110A. Similar to the canary stamp data associated with the next-hop node 108A, the additional canary stamp data associated with the second-hop node 110A can include security measurements taken from the second-hop node 110A.

In other cases, the second-hop node 110A can update the canary stamp data in the packet with new canary stamp data representative of the canary stamp data from the next-hop node 108A and canary stamp data from the second-hop node 110A. To illustrate, in some cases, the canary stamp data in the packet received by the second-hop node 110A can include a canary stamp digest from the next-hop node 108A. The canary stamp digest from the next-hop node 108A can include a hash of the security measurements taken at the next-hop node 108A. The second-hop node 110A can then create a hash of security measurements taken from the second-hop node 110A to create a canary stamp for the second-hop node 110A. The second-hop node 110A can then update or replace the canary stamp data in the packet with a new canary stamp digest, which can be a digest of the canary stamp digest from the next-hop node 108A and the canary stamp of the second-hop node 110A (e.g., the hash of the security measurements taken from the second-hop node 110A).

This way, the new canary stamp digest included in the packet by the second-hop node 110A can represent both the canary stamp digest (and the security measurements) from the next-hop node 108A and the canary stamp digest (and the security measurements) from the second-hop node 110A. In some examples, each hop that receives the packet can similarly update the canary stamp data in the packet to include a new canary stamp digest. The final version of the canary stamp digest in the packet to the destination node 116 can thus reflect or represent the canary stamp digest (and the security measurements) from each node along the path of the packet. A verifier system (e.g., 106) or an inline node can compare that final version of the canary stamp digest in the packet with an expected canary stamp digest calculated based on expected security measures for each of the nodes in the path, to validate (or invalidate) the final version of the canary stamp digest.

In some cases, the second-hop node 110A can also sign (520) some or all of the canary stamp data added or updated by the second-hop node 110A, as previously explained. The second-hop node 110A can then send (522) the packet with the new or updated canary stamp data, along the path to the N-hop node 112A. The N-hop node 112A can receive the packet and validate (524) the canary stamp data in the packet.

In some examples, when validating the canary stamp data, the N-hop node 112A can check any signatures, nonce values, and/or time or counter values in the canary stamp data to verify that the canary stamp data has not been tampered with and is sufficiently fresh to be reliable. Moreover, in some cases, to validate the canary stamp data, the N-hop node 112A can compare the canary stamp data in the packet with an expected canary stamp data value(s) calculated based on the nodes traversed by the packet and associated security measurements (or expected security measurements).

For example, the N-hop node 112A can create a digest of a known or previous state (e.g., known or previous security measurements) of each node traversed by the packet and compare the resulting digest with a canary stamp digest in the packet. If the digests match, the N-hop node 112A can determine that the nodes traversed by the packet have not have had changes in state and/or are not compromised. In some cases, if the digests do not match, the N-hop node 112A can check the security measurements from one or more nodes along the path of the packet to determine which node has had a change in state and/or is potentially compromised.

If the N-hop node 112A determines that a node is compromised or is unable to verify that the node is not compromised, the N-hop node 112A report such findings or otherwise trigger a remediation action to avoid a potential compromise of data and/or network resources. For example, if a node is determined to be compromised or its trustworthiness/integrity cannot be confirmed, a policy can be implemented on the network to avoid routing traffic through that node until that node can be returned to a normal state or confirmed to not be compromised. As another example, if a node is determined to be compromised or its trustworthiness/integrity cannot be confirmed, the node can be powered off or removed from the network until the node can be returned to a normal state or confirmed to not be compromised.

In other cases, to validate the canary stamp data, the N-hop node 112A can check security measurements included in the canary stamp data and associated with each node along the path of the packet to determine if any of the nodes have had a change in state and/or have unusual, unexpected, and/or potentially problematic security measurements. For example, the N-hop node 112A can compare a security measurement(s) from each node with an expected security measurement(s) or previous known good security measurement(s) from each node to determine if any node has had a change in state and/or is potentially compromised.

In some cases, to validate the canary stamp data, the N-hop node 112A can check if the canary stamp data matches a previous version of the canary stamp data to determine if any state changes have occurred on any of the nodes along the path of the packet. The N-hop node 112A can also check a nonce and/or time or counter value to verify that the canary stamp data is fresh and is not part of a replay attack. If the canary stamp data matches the previous version of the canary stamp data, the canary stamp data is fresh, and there are no indications of a possible replay attack, the N-hop node 112A can determine that none of the nodes have had a change in state and validate the canary stamp data. The validated canary stamp data can indicate that the nodes along the path of the packet are not currently compromised.

The N-hop node 112A can then send (526) the packet to the destination node 116. In some cases, prior to sending the packet to the destination node 116, the N-hop node 112A can add/update the canary stamp data to include canary stamp data from the N-hop node 112A and/or reflect security measurements from the N-hop node 112A. The N-hop node 112A can send the packet to the destination node 116 with the current version of the canary stamp data to allow the destination node 116 itself verify that the packet traversed only through uncompromised nodes. Moreover, in some cases, prior to sending the packet, the N-hop node 112A can also sign the canary stamp data as previously described.

In some cases, in validating the canary stamp data as described herein, the N-hop node 112A can determine or verify whether the packet traversed through uncompromised nodes or whether the packet traversed through one or more compromised nodes. Moreover, in some implementations, in addition to, or in lieu of, validating the canary stamp data, the N-hop node 112A can send the packet with the canary stamp data to a separate device for validation/verification. For example, the N-hop node 112A can send the packet with the canary stamp data to a verifier system (e.g., 106) to have the verifier system validate the canary stamp data and confirm or determine that the packet has or has not traversed through compromised and/or uncompromised nodes.

In some cases, every hop in the chain of hops traversed by the packet can provide canary stamp data and sign such canary stamp data so that all hops in the chain can be verified to be uncompromised. For example, in addition to the nodes along the path of the packet providing or updating canary stamp data as previously described, if the packet is sent to a separate verifier system for verification, the verifier system can similarly modify the packet to add or update canary stamp data to include or reflect its own canary stamp data (and/or security measurements) and prove that the verifier system is not compromised.

While FIG. 5 shows the canary stamp data in the packet being validated by the last hop (e.g., the N-hop node 112A) before the destination node 116, it should be noted that the canary stamp data can also or alternatively be validated by one or more other nodes in the path and/or a remote verifier system (e.g., 106). For example, in some cases, the canary stamp data in the packet can be validated by a centralized verifier system (e.g., at each hop or at one or more hops along the path) and/or by one or more intermediate nodes along the path (e.g., as the packet traverses those nodes). In FIG. 5, the validation performed by the N-hop node 112A is one illustrative example provided for explanation purposes.

Figure 6:
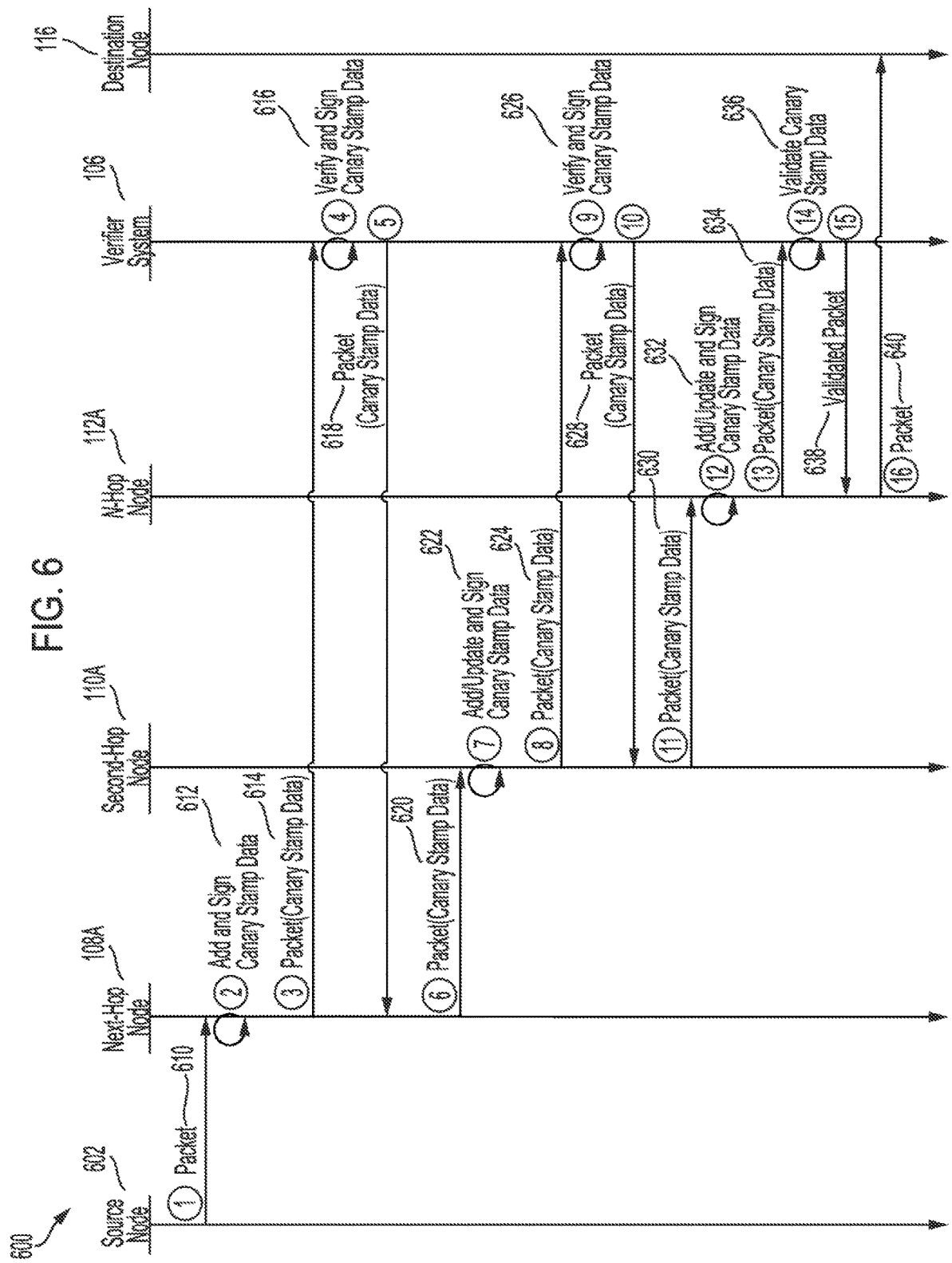

FIG. 6 illustrates another example flow 600 for providing proof of packet transit through uncompromised nodes, where a verifier system 106 verifies and signs canary stamp data at each hop along the path of the packet. It should be noted that this is one illustrative example implementation provided for explanation purposes, and in other examples the verifier system 106 may only verify and sign canary stamp data at one or more hops along the path of the packet.

In this example, the source node 602 first sends (610) a packet for the destination node 116 to the next-hop node 108A. The next-hop node 108A receives the packet and adds and signs (612) canary stamp data generated based on security measurements taken at the next-hop node 108A (e.g., via a cryptoprocessor). The next-hop node 108A can add canary stamp data containing the security measurements or a digest of the canary stamp data (e.g., the security measurements), as previously explained.

The next-hop node 108A can then send (614) the packet with the canary stamp data to the verifier system 106 for validation. In some examples, the verifier system 106 can be a centralized system, such as a centralized server or controller, configured to analyze and verify canary stamp data from nodes. In other examples, the verifier system 106 can be a distributed system including multiple verifiers configured to analyze and verify canary stamp data from nodes.

The verifier system 106 can receive the packet from the next-hop node 108A and verify and sign (616) the canary stamp data in the packet. In some cases, the verifier system 106 can check that the canary stamp data in the packet from the next-hop node 108A is fresh (e.g., based on a nonce and/or a time value or counter on the packet) and use the canary stamp data to verify that the next-hop node 108A is not compromised. The verifier system 106 can also check that the canary stamp data in the packet is not part of a replay attack. For example, the verifier system 106 can verify that the canary stamp data is not simply a copy of old canary stamp data added to the packet by an attacker or compromised component to trick the verifier system 106 into determining that the canary stamp data is valid and the next-hop node 108A has not been compromised. In some examples, the verifier system 106 can use, or check for, nonce values that introduce randomness into the data, to identify and/or protect against such replay attacks.

In some cases, when verifying and signing the canary stamp data in the packet, the verifier system 106 can add its own signed canary stamp data to the packet or update the canary stamp data with its own canary stamp data as previously explained. This way, every hop that processes the packet can be verified, and other nodes can verify that the verifier system 106 itself is not compromised.

The verifier system 106 can then send (618) the packet with the canary stamp data back to the next-hop node 108A. At this point, the canary stamp data in the packet received by the next-hop node 108A is validated and signed by the verifier system 106. The next-hop node 108A can then send (620) the packet with the canary stamp data to the second-hop node 110A. The canary stamp data in the packet can include the canary stamp and signature from the next-hop node 108A. In some cases, the canary stamp data in the packet can also reflect canary stamp data and signature data from the verifier system 106, as previously explained.

The second-hop node 110A then add/update and sign (622) the canary stamp data in the packet. In some examples, the second-hop node 110A can add new canary stamp data generated based on security measurements taken at the second-hop node 110A. Here, the packet can include the canary stamp data from the next-hop node 108A and the new canary stamp data from the second-hop node 110A. In other examples, the second-hop node 110A can take the canary stamp data from the next-hop node 108A and update it to also reflect new canary stamp data (and/or security measurements) from the second-hop node 110A.

For example, the second-hop node 110A can hash the security measurements taken at the second-hop node 110A and generate a digest based on a hash value or digest from the next-hop node 108A (e.g., the canary stamp data from the next-hop node 108A) and the hash of the security measurements taken at the second-hop node 110A. To illustrate, the second-hop node 110A can generate a new canary stamp digest as follows: New canary stamp digest=Digest of (canary stamp data from the next-hop node 108A hash(canary stamp data from the second-hop node 110A)).

In some cases, the second-hop node 110A can also implement a nonce value and/or a time value or token when calculating the new canary stamp data. For example, in some cases, the second-hop node 110A can generate the new canary stamp digest as follows: New canary stamp digest=Digest of (canary stamp data from the next-hop node 108A||hash(canary stamp data from the second-hop node 110A||PPN)), where PPN represents a per-packet nonce (PPN) assigned to the current packet and which changes per packet. As another example, in some cases, the second-hop node 110A can generate the new canary stamp digest as follows: New canary stamp digest=Digest of (canary stamp data from the next-hop node 108A||hash(canary stamp data from the second-hop node 110A||TUDA time-synchronization token associated with the second-hop node 110A)), where the TUDA time-synchronization token is provided by a central timestamp authority.

In some cases, when adding/updating canary stamp data, the second-hop node 110A can concatenate or combine canary stamp data from the next-hop node 108A and the second-hop node 110A. For example, in some cases, the canary stamp data from the next-hop node 108A can include one or more security measurements taken at the next-hop node 108A. To add/update canary stamp data, the second-hop node 110A can concatenate or combine such security measurements with one or more other security measurements taken at the second-hop node 110A. This can result in canary stamp data that includes and/or reflects security measurements from both the next-hop node 110A and the second-hop node 110A.

Once the added/updated and signed the canary stamp data, the second-hop node 110A can send (624) the packet with the new/updated canary stamp data to the verifier system 106. The verifier system 106 can then verify and sign (626) the canary stamp data as previously explained. After verifying and signing the canary stamp data, the verifier system 106 can send (628) the packet with the canary stamp data back to the second-hop node 110A. In some cases, when verifying the canary stamp data, the verifier system 106 can also add/update the canary stamp data with its own canary stamp data generated based on security measurements taken at the verifier system 106, and sign the result prior to sending the packet with the canary stamp data to the verifier system 106.

The second-hop node 110A can receive the packet with the canary stamp data and send (630) it to the N-hop node 112A. The N-hop node 112A can receive the packet with the canary stamp data and add/update and sign (632) the canary stamp data as previously described with respect to the second-hop node 110A. The N-hop node 112A can then send (634) the packet with the new or updated canary stamp data to the verifier system 106. The verifier system 106 can receive the packet with the canary stamp data from the N-hop node 112A, and validate (636) the canary stamp data in the packet.

When validating the canary stamp data, the verifier system 106 can use the canary stamp data in the packet to verify that none of the nodes (e.g., 108A, 110A, 112A) traversed by the packet are compromised. The verifier system 106 can verify the integrity or trustworthiness of each of the nodes based on the value(s) in the canary stamp data (e.g., the associated security measures, the associated digest values, etc.). Since the canary stamp data can contain security measures from each of the nodes or reflect security measures from each of the nodes (e.g., the canary stamp data can be updated at each hop based on security measures at that hop or a digest of security measures at that hop), the canary stamp data can provide an indication of the state and integrity/trustworthiness of each hop in the chain, which the verifier system 106 can use to validate (or invalidate) the canary stamp data in the packet.

In some implementations, when validating the canary stamp data, the verifier system 106 can also verify that the canary stamp data is fresh (e.g., was generated within a certain period of time from the time it was received by the verifier system 106) and/or that the canary stamp data is not a replay attack. The verifier system 106 can make such determinations based on timing information (e.g., one or more TUDA time-synchronization tokens, a time or counter value such as a TPM counter value, etc.) included in the canary stamp data and/or associated with the nodes in the path, one or more nonce values used to introduce randomness in the canary stamp data, etc.

Moreover, in some examples, when validating the canary stamp data, the verifier system 106 can also add its own signed canary stamp data to the packet or update the canary stamp data in the packet based on its own canary stamp data. Once the verifier system 106 has validated the canary stamp data, the verifier system 106 can send (638) the packet with the validated canary stamp data back to the N-hop node 112A, which can then send (640) the packet to the destination node 116.

In some cases, rather than sending the packet to the N-hop node 112A, the verifier system 116 can deliver the packet to the destination node 116, thereby reducing the amount of traffic (e.g., by eliminating the communication of the packet back to the N-hop node 112A for subsequent delivery to the destination node 116). Moreover, in some cases, the packet delivered (e.g., by the N-hop node 112A or the verifier system 106) to the destination node 116 can include the current version of the canary stamp data to allow the destination node 116 to perform its own verification that the packet traversed only through uncompromised nodes.

Figure 7:
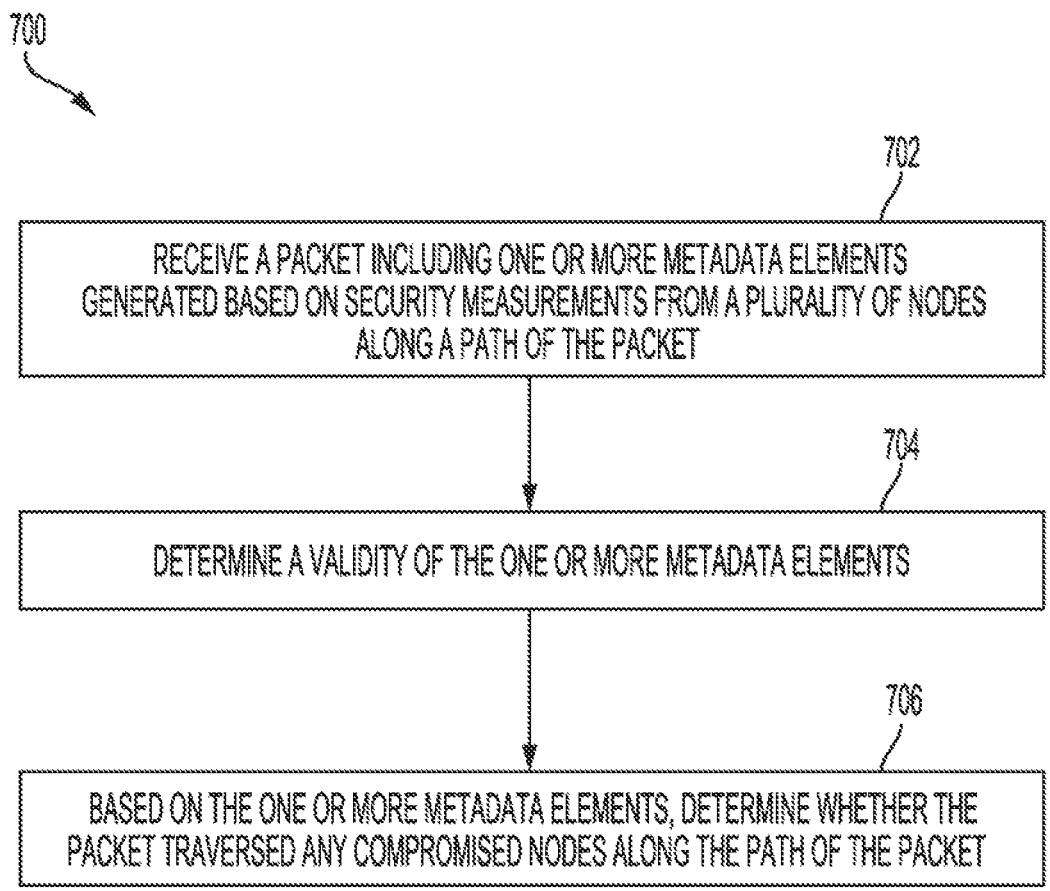
FIG. 7 illustrates an example method for proving a packet transit through uncompromised nodes, in accordance with some examples.

Having described example systems and concepts, the disclosure now turns to the example method 700 for providing proof of packet transit through uncompromised nodes, as illustrated in FIG. 7. For the sake of clarity, the method 700 is described in terms of verifier system 116, as shown in FIGS. 1-3, configured to practice the method 700. The steps outlined herein are examples and can be implemented in any combination thereof, including combinations that exclude, add, or modify certain steps.

At step 702, the verifier system 116 can receive a packet including one or more metadata elements (e.g., canary stamp data) generated based on security measurements from a plurality of nodes (e.g., 108, 110, 112) along a path of the packet. The one or more metadata elements can include or refer to canary stamp data as previously described. In some examples, the canary stamp data (e.g., the one or more metadata elements) can include a digest created based on the security measurements. In some cases, the digest can be created using a one-way hash that ensures that the canary stamp data (e.g., the one or more metadata elements) recorded by any node cannot be removed or modified without detection.

Moreover, in some examples, the one or more metadata elements (e.g., the canary stamp data) can include the security measurements from the plurality of nodes. In some examples, the security measurements can include information identifying a respective firmware at each of the plurality of nodes, what software has been loaded at each of the plurality of nodes, a respective sequence of software loaded at each of the plurality of nodes, hardware information associated with the plurality of nodes, any operating system changes at the plurality of nodes, a runtime state at the plurality of nodes, etc.

In some examples, the one or more metadata elements can also include one or more nonce values. For example, in some cases, the one or more metadata elements can one or more per-packet nonce values; one or more signatures; and/or one or more time values, such as one or more packet trace timestamps, time counters (e.g., TPM counters), TUDA time-synchronization tokens, etc.

The verifier system 116 can receive the packet from a particular node in the path of the packet. For example, the verifier system 116 can receive the packet from the last-hop node before the destination node or the destination node itself. In some examples, the verifier system 116 can receive the packet from each hop along the path as the packet traverses the hops in the path. The packet from each hop can include one or more new or updated metadata elements provided by that hop. In such examples, the verifier system 116 can validate the one or more metadata elements as it traverses each hop in the path.

At step 704, the verifier system 116 can determine a validity of the one or more metadata elements in the packet.

In some cases, the verifier system 116 can analyze the contents of the one or more metadata elements and determine a validity of the one or more metadata elements by comparing one or more values in the one or more metadata elements with one or more expected values calculated for the one or more metadata elements (e.g., based on known, expected, or predicted security measurements associated with the plurality of nodes), checking one or more signatures (e.g., one or more respective node or cryptoprocessor signatures) in the one or more metadata elements, verifying timing information (e.g., one or more timestamps, counter values, TUDA time-synchronization tokens, etc.) associated with the one or more metadata elements, and/or verifying one or more nonce values implemented by the one or more metadata elements.

In some cases, the verifier system 116 can also update the one or more metadata elements based on metadata (e.g., canary stamp data) from the verifier system 116, or add new metadata (e.g., canary stamp data) from the verifier system 116. Moreover, if the verifier system 116 is able to validate the one or more metadata elements, the verifier system 116 can sign the one or more metadata elements in the packet to indicate that the verifier system 116 has validated the one or more metadata elements and/or provide protection against unauthorized tampering with the one or more metadata elements.

At step 706, the verifier system 116 can determine, based on the one or more metadata elements, whether the packet traversed any compromised nodes along the path of the packet. In some cases, the verifier system 116 can make such determination based on a determined validity of the one or more metadata elements in the packet. Moreover, in some cases, the verifier system 116 can analyze the contents of the one or more metadata elements and make such determination based on the contents of the one or more metadata elements.

For example, in some cases, if the one or more metadata elements include the security measurements from the plurality of nodes, the verifier system 116 can analyze the security measurements to verify that none of the nodes are compromised. The verifier system 116 can review state information (e.g., hardware state, firmware state, software state, runtime state, etc.) captured by the security measurements to determine if the state of any nodes has changes and/or appears compromised, suspicious, unexpected, or abnormal. To illustrate, if the security measurements indicate that the operating system (OS) or a sequence of software loaded at a node has changed since a previous known state of the node or is different than expected, the verifier system 116 flag that node as potentially (or actually) compromised. In some cases, the verifier system 116 can analyze the specific changes to the OS or sequence of software loaded to determine whether the node is indeed compromised or should be deemed compromised.

In other examples, if the one or more metadata elements include a digest of the security measurements from the plurality of nodes, the verifier system 116 can compare the digest with a digest it calculates for the plurality of nodes based on expected, normal, and/or predicted security measurements. For example, the verifier system 116 can calculate a digest (e.g., using the same algorithm used to generate the digest included in the one or more metadata elements) based on expected security measurement values for the plurality of nodes, previous known security measurement values associated with the plurality of nodes, or security measurement values considered to be desirable or normal (e.g., not indicative of a compromised node). The verifier system 116 can then compare the calculated digest with the digest associated with (e.g., included in or reflected by) the one or more metadata elements to determine if they match. A mismatch between the digests can indicate that one or more nodes are potentially compromised.

In some cases, the digest of the security measurements from the plurality of nodes (e.g., the digest included in or reflected by the one or more metadata elements) can be generated using one or more nonce values used to introduce randomness to protect against replay attacks. In such cases, the verifier system 116 can also implement such one or more nonce values when calculating the digest that the verifier system 116 compares with the digest in the packet. For example, in some cases, a nonce can be provided to the plurality of nodes for use in creating or updating a respective digest at each hop. The nonce can be a nonce specifically defined for the packet (e.g., a per-packet nonce which changes for every packet) or a nonce specifically defined for one or more of the plurality of nodes. The verifier system 116 can thus know the value(s) of the nonce and use such value(s) to calculate the digest it compares with the digest in the packet it receives.

In some cases, each node along the path of the packet can similarly perform a validity check and/or a verification check of the one or more metadata elements in the packet, as described with respect to steps 704 and 706. Moreover, in some cases, each node can modify the one or more metadata elements in the packet as the node processes the packet. For example, when a node receives the packet with the one or more metadata elements, the node can add its own metadata (e.g., its own canary stamp data) to the one or more metadata elements or update the one or more metadata elements based on its own metadata (e.g., its own canary stamp data). Each node can also sign (e.g., via TPM or a cryptoprocessor) the one or more metadata elements in the packet prior to forwarding the packet to the next hop and/or a centralized verification system (e.g., verifier system 116).

In some implementations, the one or more metadata elements can be carried by the packet in an IOAM data field on the packet. In some examples, the one or more metadata elements can be carried in an IOAM trace option. In other examples, the one or more metadata elements can be carried in an IOAM proof-of-transit (POT) option. Moreover, in some cases, the packet can be transmitted and/or processed using one or more encapsulating protocols such as, for example and without limitation, IPv4, IPv6, NSH (network service header), segment routing, Geneve, VXLAN, VXLAN-GPE, GRE, MPLS, SRv6, etc. In other cases, the one or more metadata elements can be carried by the packet in an Inband Network Telemetry packet header, an Inband Flow Analyzer (IFA) header, or a header associated with an In-situ Flow Information Telemetry service used to transmit the packet.

In some aspects, a data element in the one or more metadata elements, such as a signature or canary stamp data value(s), can be generated by one or more TPMs (e.g., TPM, TPM2, or any current or future version of TPM) implemented by one or more nodes from the plurality of nodes and/or one or more cryptoprocessors implemented by the one or more nodes.

In some cases, determining whether the packet traversed any compromised nodes along the path of the packet can include identifying each hop traversed by the packet and providing a proof-of-transit of the packet. In some examples, the hops traversed by the packet can be identified using IOAM tracing, using routing state information, or sending active probes.

In some implementations, the one or more metadata elements can include one or more trace timestamps defined in IOAM. Since the one or more metadata elements can be time bound, the packet trace timestamps can be used to validate the one or more metadata elements in the time window the packet visited a particular node.

In some cases, when determining whether the packet traversed any compromised nodes, the verifier system 116 can check a public key of one or more nodes that added/updated the one or more metadata elements, a portion of the one or more metadata elements, and/or a previous version of the one or more metadata elements.

The disclosure now turns to FIGS. 8 and 9, which illustrate example network nodes and computing devices, such as switches, routers, client devices, endpoints, servers, and so forth.

FIG. 8 illustrates an example network device 800 suitable for performing switching, routing, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 can accomplish these functions under the control of software including an operating system and any appropriate applications software. CPU 804 may include one or more processors 808, such as a processor from the INTEL X98 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC) 812, which can be configured to perform routing and/or switching operations. The ASIC 812 can communicate with other components in the network device 800 via the connection 810, to exchange data and signals and coordinate various types of operations by the network device 800, such as routing, switching, and/or data storage operations, for example.

FIG. 9 illustrates a computing system architecture 900 including various components in electrical communication with each other using a connection 906, such as a bus. Example system architecture 900 includes a processing unit (CPU or processor) 904 and a system connection 906 that couples various system components including the system memory 920, such as read only memory (ROM) 918 and random access memory (RAM) 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 916, read only memory (ROM) 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
    receiving a packet comprising one or more metadata elements generated based on security measurements of one or more nodes along a path of the packet, the one or more security measurements being indicative of one or more of software and hardware integrity at the one or more nodes along the path;
    inspecting an in-situ operations, administration, and management data field of the packet to determine a validity of the one or more metadata elements, the inspecting including at least one of a comparison of one or more values in the one or more metadata elements with one or more expected values calculated for the one or more metadata elements, one or more signatures in the one or more metadata elements, and timing information associated with the one or more metadata elements; and
    based on the one or more metadata elements, determining whether a node from the one or more nodes comprises a compromised node, wherein at least one of a data element in the one or more metadata elements and the one or more signatures in the one or more metadata elements are generated by one or more trusted execution environments (TEE) or one or more trusted platform modules (TPMs) implemented by the node or one or more cryptoprocessors implemented by the node.

2. The method of claim 1, wherein the security measurements comprise at least one of a hardware integrity measurement, a runtime integrity measurement, a firmware integrity measurement, a software integrity measurement, information identifying what software has been loaded at the one or more nodes, a respective sequence of software loaded at the one or more nodes, and one or more operating system changes at the one or more nodes.

3. The method of claim 1, wherein the one or more metadata elements comprise the security measurements or one or more hash values representing the security measurements.

4. The method of claim 1, wherein the one or more metadata elements comprise node integrity metadata generated based on respective node integrity information from each of the one or more nodes, the respective node integrity information being generated based on a respective security measurement from each of the one or more nodes.

5. The method of claim 1, further comprising:
    updating a verification digest in the one or more metadata elements in the packet to yield an updated verification digest, the verification digest being updated based on a hash of at least one security measurement associated with the node.

6. The method of claim 1, wherein the one or more metadata elements are included in an In-Situ Operations, Administration, and Maintenance (IOAM) data field on the packet, an Inband Network Telemetry packet header associated with the packet, an Inband Flow Analyzer (IFA) header associated with the packet, or a header associated with an In-situ Flow Information Telemetry service used to transmit the packet, the IOAM data field being associated with an IOAM trace option or an IOAM proof-of-transit (POT) option.

7. The method of claim 1, wherein the one or more metadata elements comprise one or more nonce values associated with the one or more nodes.

8. The method of claim 1, wherein the timing information associated with the one or more metadata elements comprises at least one of a respective timestamp associated with each of the one or more nodes, one or more Time-Based Uni-Directional Attestation (TUDA) sync tokens, one or more Trusted Platform Module (TPM) counters, and one or more packet trace timestamps defined by an In-Situ Operations, Administration, and Maintenance telemetry scheme.

9. A system comprising:
one or more processors; and
memory having stored therein instructions which, when executed by the one or more processors, cause the one or more processors to:
receive a packet comprising one or more metadata elements generated based on security measurements of one or more nodes along a path of the packet, the one or more security measurements being indicative of one or more of software and hardware integrity at the one or more nodes along the path;
inspect an in-situ operations, administration, and management data field of the packet to determine a validity of the one or more metadata elements, the inspection including at least one of a comparison of one or more values in the one or more metadata elements with one or more expected values calculated for the one or more metadata elements, one or more signatures in the one or more metadata elements, and timing information associated with the one or more metadata elements; and
based on the one or more metadata elements, determine whether a node from the one or more nodes comprises a compromised node, wherein at least one of a data element in the one or more metadata elements and the one or more signatures in the one or more metadata elements are generated by one or more trusted execution environments (TEE) or one or more trusted platform modules (TPMs) implemented by the node or one or more cryptoprocessors implemented by the node.

10. The system of claim 9, wherein the security measurements comprise at least one of a hardware integrity measurement, a runtime integrity measurement, a firmware integrity measurement, a software integrity measurement, information identifying what software has been loaded at the one or more nodes, a respective sequence of software loaded at the one or more nodes, and one or more operating system changes at the one or more nodes.

11. The system of claim 9, wherein the one or more metadata elements comprise the security measurements or one or more hash values representing the security measurements.

12. The system of claim 9, wherein the one or more metadata elements comprise node integrity metadata generated based on respective node integrity information from each of the one or more nodes, the respective node integrity information being generated based on a respective security measurement from each of the one or more nodes.

13. The system of claim 9, wherein the memory comprises instructions stored thereon which, when executed by the one or more processors, cause the one or more processors to:
update a verification digest in the one or more metadata elements in the packet to yield an updated verification digest, the verification digest being updated based on a hash of at least one security measurement associated with the node.

14. The system of claim 9, wherein the one or more metadata elements are included in an In-Situ Operations, Administration, and Maintenance (IOAM) data field on the packet, an Inband Network Telemetry packet header associated with the packet, an Inband Flow Analyzer (IFA) header associated with the packet, or a header associated with an In-situ Flow Information Telemetry service used to transmit the packet, the IOAM data field being associated with an IOAM trace option or an IOAM proof-of-transit (POT) option.

15. The system of claim 9, wherein the one or more metadata elements comprise one or more nonce values associated with the one or more nodes.

16. The system of claim 9, wherein the timing information associated with the one or more metadata elements comprises at least one of a respective timestamp associated with each of the one or more nodes, one or more Time-Based Uni-Directional Attestation (TUDA) sync tokens, one or more Trusted Platform Module (TPM) counters, and one or more packet trace timestamps defined by an In-Situ Operations, Administration, and Maintenance telemetry scheme.

17. A non-transitory computer-readable storage medium having stored thereon instructions which, when executed by one or more processors, cause the one or more processors to:
receive a packet comprising one or more metadata elements generated based on security measurements of one or more nodes along a path of the packet, the one or more security measurements being indicative of one or more of software and hardware integrity at the one or more nodes along the path;
inspect an in-situ operations, administration, and management data field of the packet to determine a validity of the one or more metadata elements, the inspection including at least one of a comparison of one or more values in the one or more metadata elements with one or more expected values calculated for the one or more metadata elements, one or more signatures in the one or more metadata elements, and timing information associated with the one or more metadata elements; and
based on the one or more metadata elements, determine whether a node from the one or more nodes comprises a compromised node, wherein at least one of a data element in the one or more metadata elements and the one or more signatures in the one or more metadata elements are generated by one or more trusted execution environments (TEE) or one or more trusted platform modules (TPMs) implemented by the node or one or more cryptoprocessors implemented by the node.

18. The non-transitory computer-readable storage medium of claim 17, wherein the security measurements comprise at least one of a hardware integrity measurement, a runtime integrity measurement, a firmware integrity measurement, a software integrity measurement, information identifying what software has been loaded at the one or more nodes, a respective sequence of software loaded at the one or more nodes, and one or more operating system changes at the one or more nodes.

19. The non-transitory computer-readable storage medium of claim 17, wherein the one or more metadata elements comprise the security measurements or one or more hash values representing the security measurements.

20. The non-transitory computer-readable storage medium of claim 17, wherein the one or more metadata elements comprise node integrity metadata generated based on respective node integrity information from each of the one or more nodes, the respective node integrity information being generated based on a respective security measurement from each of the one or more nodes.

\* \* \* \* \*